(12) United States Patent
Keller et al.

(10) Patent No.: US 6,725,441 B1
(45) Date of Patent: Apr. 20, 2004

(54) METHOD AND APPARATUS FOR DEFINING AND MODIFYING CONNECTIONS BETWEEN LOGIC CORES IMPLEMENTED ON PROGRAMMABLE LOGIC DEVICES

(75) Inventors: Eric R. Keller, Boulder, CO (US); Cameron D. Patterson, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/533,092

(22) Filed: Mar. 22, 2000

(51) Int. Cl.[7] .............................................. G06F 17/50
(52) U.S. Cl. .............................. 716/16; 716/17; 326/39
(58) Field of Search ................................ 700/18; 716/1, 716/12–18; 713/100; 326/37–41, 74; 712/10–17

(56) References Cited

U.S. PATENT DOCUMENTS

| | | | | |
|---|---|---|---|---|
| 5,596,742 A | * | 1/1997 | Agarwal et al. | 716/16 |
| 5,636,368 A | | 6/1997 | Harrison et al. | 716/16 |
| 5,761,484 A | * | 6/1998 | Agarwal et al. | 716/16 |
| 5,923,894 A | * | 7/1999 | Sollars | 712/38 |
| 5,946,219 A | | 8/1999 | Mason et al. | 716/16 |
| 5,946,478 A | * | 8/1999 | Lawman | 716/17 |
| 6,026,230 A | | 2/2000 | Lin et al. | 703/13 |
| 6,078,736 A | * | 6/2000 | Guccione | 716/16 |
| 6,112,020 A | * | 8/2000 | Wright | 716/17 |
| 6,150,842 A | * | 11/2000 | Agrawal et al. | 326/41 |
| 6,160,420 A | * | 12/2000 | Gamal et al. | 326/41 |
| 6,182,183 B1 | * | 1/2001 | Wingard et al. | 710/305 |
| 6,216,259 B1 | | 4/2001 | Guccione et al. | 716/17 |
| 6,230,307 B1 | | 5/2001 | Davis et al. | 716/16 |
| 6,311,316 B1 | * | 10/2001 | Huggins et al. | 716/12 |
| 6,446,242 B1 | * | 9/2002 | Lien et al. | 716/6 |
| 6,487,709 B1 | * | 11/2002 | Keller et al. | 716/14 |

\* cited by examiner

*Primary Examiner*—Maria N. Von Buhr
(74) *Attorney, Agent, or Firm*—LeRoy D. Maunu

(57) ABSTRACT

A method and apparatus for generating a configuration bitstream for a programmable logic device using logic ports associated with logic cores. Logic ports are associated with respective ones of a plurality of logic cores, and logical connections are made between selected ones of the ports of the logic cores. Source pins, wherein a pin represents an output resource of a programmable element of the programmable logic device, are associated with selected ones of the ports. A sink pin represents an input resource of a programmable element of the programmable logic device, and sink pins are associated with selected ones of the ports. In response to a route programming interface call that references a source port and a sink port, bits for the configuration bitstream are generated for routing resources to connect selected ones of the source pins to selected ones of the sink pins. Usage of logic ports assists in runtime reconfiguration of logic.

20 Claims, 6 Drawing Sheets

METHOD AND APPARATUS FOR DEFINING AND MODIFYING CONNECTIONS BETWEEN LOGIC CORES IMPLEMENTED ON PROGRAMMABLE LOGIC DEVICES

RELATED PATENT APPLICATION.

The present application is related to U.S. Pat. No. 6,487,709, issued Nov. 26, 2002, entitled, "RUN-TIME ROUTING FOR PROGRAMMABLE LOGIC DEVICES" and filed on Feb. 9, 2000 by Keller, Guccione, and Levi, the contents of which are incorporated herein by reference.

GOVERNMENT CONTRACT

The U.S. Government has a paid-up license in this invention and the right in limited circumstances to require the patent owner to license others on reasonable terms as provided for by the terms of DABT63-99-3-0004 awarded by DARPA.

FIELD OF THE INVENTION

The present invention generally relates to the configuration of programmable logic devices, and more particularly to defining connections between logic cores on programmable logic devices.

BACKGROUND

Field programmable gate arrays (FPGAs), first introduced by Xilinx in 1985, are becoming increasingly popular devices for use in electronics systems. For example, communications systems employ FPGAs in large measure for their re-programmability and high speed. In general, the use of FPGAs continues to grow at a rapid rate because they permit relatively short design cycles, reduce costs through logic consolidation, and offer flexibility in their re-programmability.

The field of reconfigurable computing has advanced steadily for the past decade, using FPGAs as the basis for high-performance reconfigurable systems. Run-Time Reconfigurable (RTR) systems distinguish themselves by performing circuit logic and routing customization at run-time. RTR systems using FPGAs are expected to result in systems that require less hardware, less software, and fewer input/output resources than traditional FPGA-based systems. However, scarcity of software that supports RTR is believed to be one reason that RTR has been outpaced by research in other areas of reconfigurable computing.

Whereas the time taken to generate a programming bitstream is generally not real-time critical with traditional systems having FPGAs, the time required to generate the programming bitstream for an RTR system may be critical from the viewpoint of a user who is waiting for the FPGA to be reconfigured. Thus, in a runtime environment it is expected that the reconfiguration process will require no more than a few seconds, or even a fraction of a second.

In both static and run-time configuration environments, logic cores are utilized to quickly integrate previously implemented functionality into a workable system. Each logic core is comprised of logic that performs a specific function when implemented on an FPGA. In the JBits environment that is available from Xilinx, a library of logic cores can be defined and made available for use in run-time configuration. JBits provides Java classes for defining and implementing cores.

The relationships between cores are generally defined by the various interconnections, which are characterized herein as the pin connections. That is, a certain output pin of a first core is connected to a certain input pin of a second core. In the context of configurable logic blocks (CLBs) of an FPGA, a "pin" may correspond, for example, to the output of a CLB multiplexer or the input to a lookup table. Other programmable logic devices (PLDs) have comparable "pins".

Reconfiguration of an FPGA may include routing and rerouting connections between the logic sections. Present run-time routing methods provide a great deal of program control over the routing process. For example, the JBits environment allows a program to manipulate individual bits in the configuration bitstream for configuring routing resources. While this approach provides a great deal of flexibility, the drawback is added program complexity.

In some instances, multiple logic cores are assembled into a hierarchy of cores to implement a higher level function. Tracking the various pin connections between the cores can be burdensome and error-prone, thereby impeding the development of RTR systems. A method and apparatus that addresses the aforementioned problems, as well as other related problems, is therefore desirable.

SUMMARY OF THE INVENTION

In various embodiments, a method and apparatus are provided for generating a configuration bitstream for a programmable logic device using logic ports that are associated with logic cores. Logic ports are associated with respective ones of a plurality of logic cores, and logical connections are made between selected ones of the ports of the logic cores. Source pins, wherein a pin represents an output resource of a programmable element of the programmable logic device, are associated with selected ones of the ports. A sink pin represents an input resource of a programmable element of the programmable logic device, and sink pins are associated with selected ones of the ports. By providing a level of abstraction for defining inputs to and outputs from logic cores that is above the level of physical input/output resources, run-time parameterizable logic cores can be interconnected by reference to logic input and output relationships between cores rather than by reference to pin-to-pin connections between cores. In response to a route programming interface call that references a source port and a sink port, bits for the configuration bitstream are generated for routing resources to connect selected ones of the source pins to selected ones of the sink pins.

It will be appreciated that various other embodiments are set forth in the Detailed Description and Claims that follow.

BRIEF DESCRIPTION OF THE DRAWINGS

Various aspects and advantages of the invention will become apparent upon review of the following detailed description and upon reference to the drawings, in which.

DETAILED DESCRIPTION

Various embodiments of the present invention are described in terms of extensions to the JBits software, which is available from Xilinx. While the invention is not limited in scope to the JBits software, the various embodiments are presented in terms of specific examples involving the JBits programming environment. Those skilled in the art will appreciate that the invention could be implemented in other programming languages, applied to programmable logic devices (PLDs) other than FPGAs, or adapted to applications that are not run-time reconfigurable.

Figure 1:
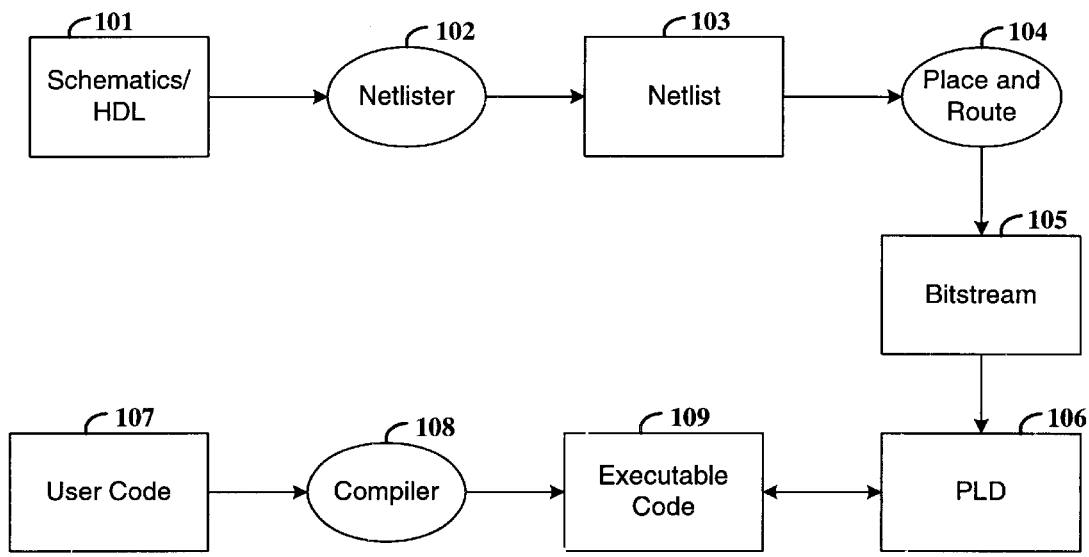
FIG. 1 illustrates two design paths for initially configuring a PLD and thereafter reconfiguring the PLD at run-time.

Design of a circuit implemented in a PLD using a reconfigurable logic coprocessor currently requires a combination of two distinct design paths, as shown in FIG. 1. The first and perhaps most significant portion of the effort involves circuit design using traditional CAD tools. The design path for these CAD tools typically comprises entering a design 101 using a schematic editor or hardware description language (HDL), using a netlister 102 to generate a net list 103 for the design, importing this netlist into an placement and routing tool 104, which finally generates a bitstream file 105 of configuration data used to configure the programmable logic device (PLD) 106.

Once the configuration data has been produced, the next task is to provide software to interface the processor to the PLD. The user enters user code 107 describing the user interface instructions, which is then compiled using compiler 108 to produce executable code 109. The instructions in executable code 109 are then used by the processor to communicate with the configured PLD 106. It is also known to use executable code 109 to control the configuration of PLD 106 with bitstream file 105. This series of tasks is usually completely decoupled from the task of designing the circuit and hence can be difficult and error-prone.

In addition to the problems of interfacing the hardware and software in this environment, there is also the problem of design cycle time. Any change to the circuit design requires a complete pass through the hardware design tool chain (101–106 in FIG. 1). This process is time consuming, with the place and route portion of the chain typically taking several hours to complete.

Finally, this approach provides no support for run-time reconfiguration. The traditional hardware design tools provide support almost exclusively for static design. It is difficult to imagine constructs to support run-time reconfiguration in environments based on schematic or HDL design entry.

Figure 2:
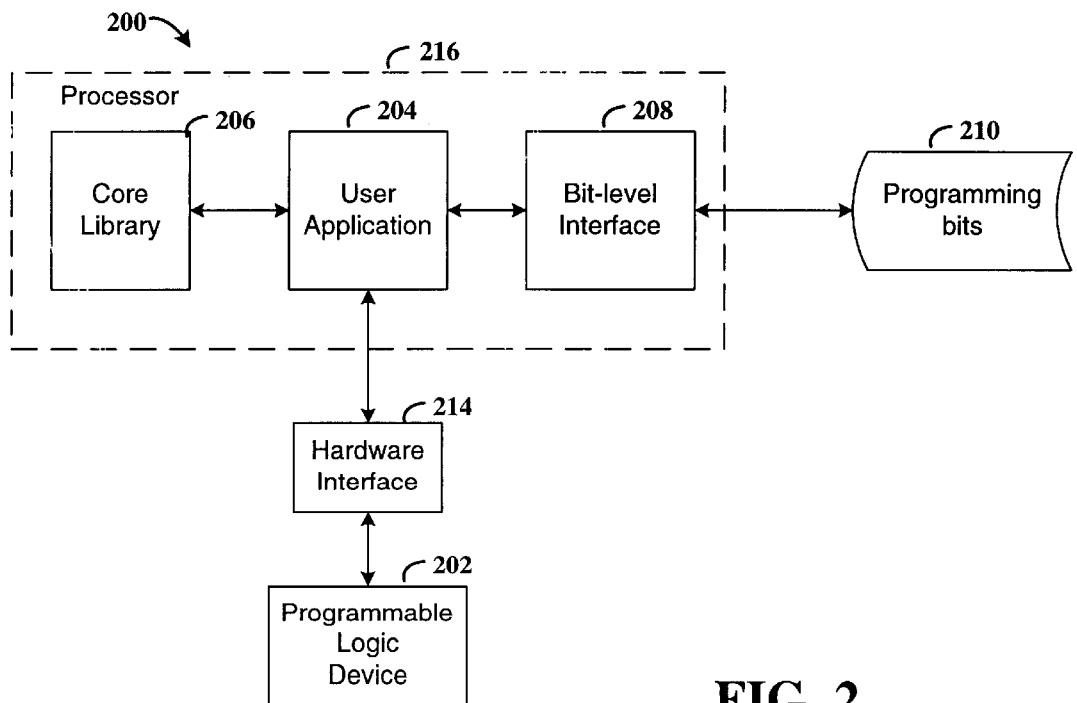
FIG. 2 is a block diagram of a system for run-time configuration and reconfiguration of a programmable logic device.

FIG. 2 is a block diagram of a system 200 for run-time configuration and reconfiguration of a programmable logic device 202. System 200 includes a user application program 204 that is written in the Java® language, for example. The application program 204 may be written to perform various functions relative to the environment in which system 200 is used. For example, in addition to configuration and/or run-time reconfiguration of programmable logic device 202, the user application program 204 may be programmed to provide user-interface functions and/or digital signal processing.

Core library 206 is a collection of macrocell or "core" generators that are implemented as Java classes. The cores are generally parameterizable and relocatable within a device. Examples of cores include counters, adders, multipliers, constant adders, constant multipliers, flip-flops and other standard logic and computation functions.

Bit-level interface 208 includes an application program interface that allows the user application program 204 to manipulate configurable resources of programmable logic device 202. The bit-level interface also includes a set of functions, one or more of which are invoked when the user application program 204 references the application program interface. The set of functions in the bit-level interface manipulate selected programming bits 210, based on the type of programmable logic device. For example, some of the functions in the set may be programmed for certain devices in the XC4000EX family of FPGAs from Xilinx, and others of the functions may be programmed for other devices in the XC4000XL family. Bit-level interface software is generally understood by those skilled in the art. For example, bit-level interface software has been provided for use with the Virtex series FPGA from Xilinx.

The programming bits are stored in a storage element (not shown). The storage element may be magnetic, optical, electronic, or a suitable combination thereof that is readable and writable.

While core library 206, user application 204, and bit-level interface 208 are written in Java in the example embodiment, it will be appreciated that many other languages would also be suitable.

Hardware interface 214 includes a portable layer of software and accompanying hardware to couple application program 204 to programmable logic device 202. For example, hardware interface 214 may be the Xilinx Hardware Interface (XHWIF), which is available from Xilinx.

Processor 216 is coupled to programmable logic device 202 via hardware interface 214. The functional requirements of system 200 dictate the particular style and capabilities of processor 216. For example, some applications may call for a RISC based processor, while others may call for a CISC. Various ones of special purpose or general purpose processors from manufacturers such as Intel, Sun Microsystems, Motorola, IBM, AMD and others may be suitable.

Figure 3:
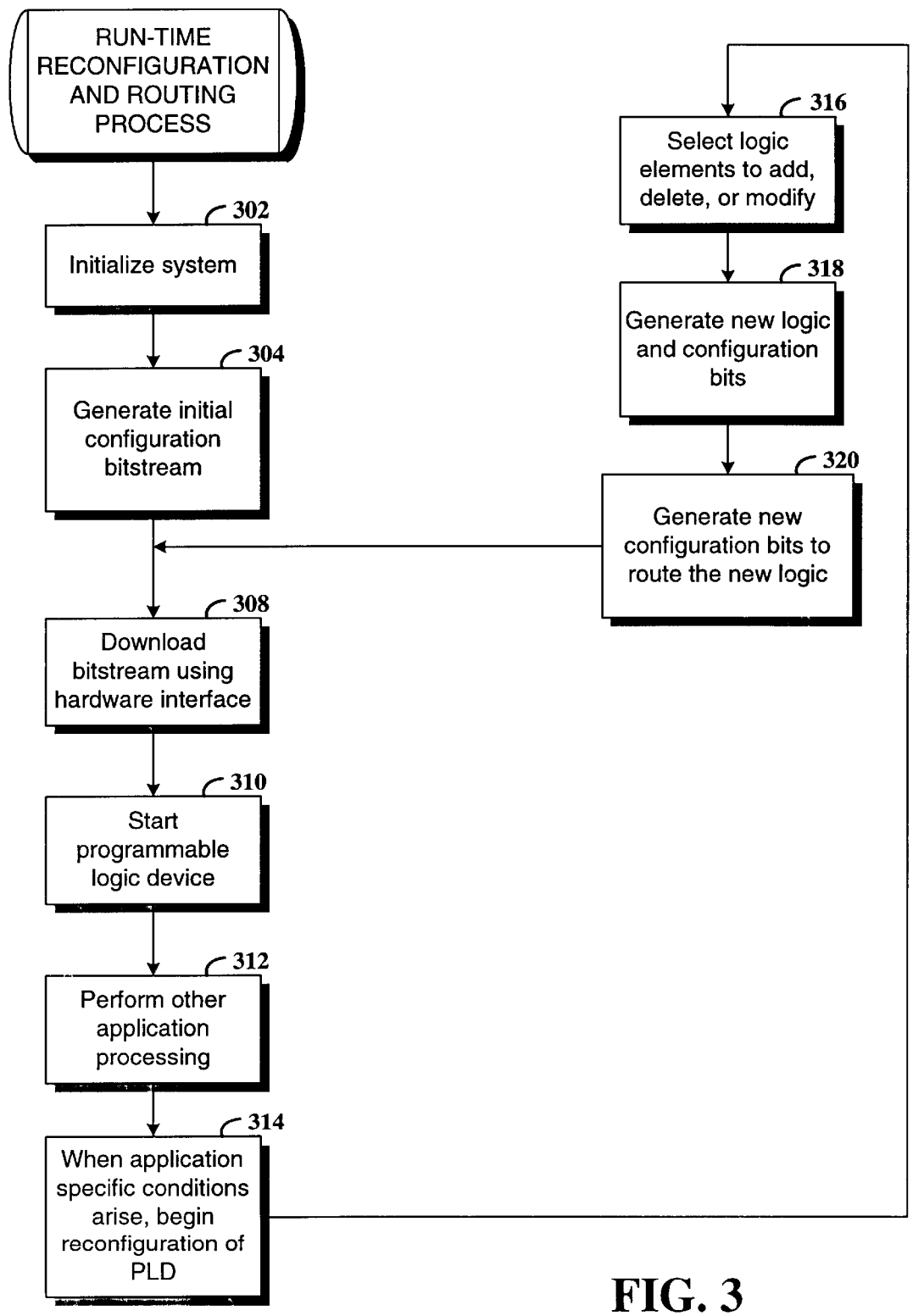
FIG. 3 is a flowchart of a process for initial configuration and run-time reconfiguration of a programmable logic device.

FIG. 3 is a flowchart of a process for initial configuration and run-time reconfiguration of a programmable logic device. The process can be implemented as an application program, for example, user application program 204 of FIG. 2. The example process proceeds in two phases. In the first phase, the programmable logic device is initially configured, and in the second phase, the device is dynamically reconfigured in accordance with application processing requirements.

At step 302, various components in the example system, aside from the programmable logic device, are initialized. The process then proceeds with configuration of the programmable logic device. At step 304, an initial configuration bitstream is generated. For example, the bitstream can be generated using a core library to generate core logic along with routing configuration. Based on the generated logic cores and router cores, a configuration bitstream is generated to configure the programmable logic device 202. The initial configuration bitstream is downloaded to the programmable logic device 202 at step 308, and the programmable logic device is made an operational component of the example system 200 at step 310.

Step 312 begins the run-time phase of processing by application program 204. Application program 204 includes code to monitor various application conditions, as illustrated at step 314. An example application provides adaptive digital filtering, which depends on various real-time system conditions. Run-time reconfiguration may also be initiated by, for example, user command line inputs, user GUI inputs, and the state of programmable logic device 202.

At step 316, application program 204 selects the logic elements, which define the circuit implemented by the programmable logic device, to be modified based on the information from step 314. New logic and configuration bits are generated at step 318, for example, using techniques described in the referenced patent. At step 320, new configuration bits are generated to route the new logic using the application programming interface and associated techniques described herein. Processing then proceeds to step 308.

It will be appreciated that downloading the bitstream as set forth in step 308 can involve either a partial reconfiguration or full reconfiguration of the programmable logic device 202. For example, the XC4000 series FPGAs from Xilinx support only full reconfiguration, whereas the Virtex FPGA, also from Xilinx, supports both full and partial reconfiguration. Thus, usage of the term "bitstream" is intended to encompass sequences of programming bits for both partial and full reconfiguration.

The present invention supports a run-time reconfiguration environment having a library of reusable, run-time parameterizable, and hierarchically related cores. Instead of having to track pin-to-pin connections between cores, the input and output pins of a core are associated with ports. The term "port" as used in this document refers to a logical connection point for one or more pins. In the case of an input port, one or more pins that are sinks can be associated therewith. For example, an input port may be associated with one or more of the input signal lines to CLB lookup tables that implement a core. An input port can be driven by an output port, either of the same or a different core, or by a pin outside a core. An output port is associated with either a source pin in a core or an input port. Thus, an output port may be associated with an output signal line from a multiplexer in a CLB, for example. Depending on the application-specific functionality of the core, a core may have zero or more input ports and one or more output ports.

Figure 4:
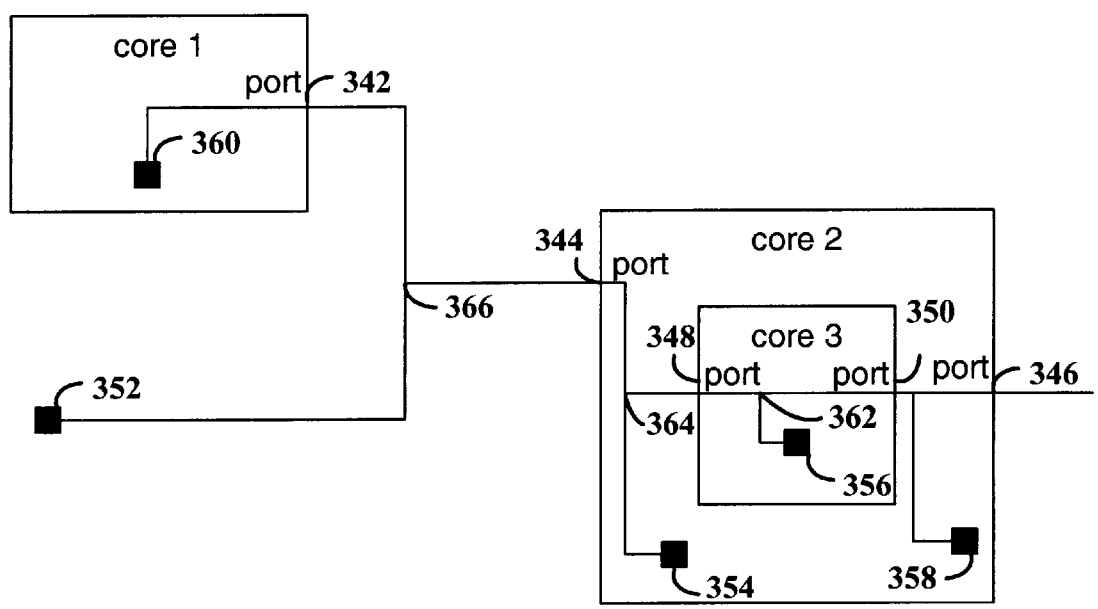
FIG. 4 is a block diagram that illustrates the relationship between ports and pins as associated with three example cores.

FIG. 4 is a block diagram that illustrates the relationship between ports and pins as associated with three example cores. Core 1 includes output port 342, core 2 includes input port 344 and output port 346, and core 3 includes input port 348 and output port 350. It will be appreciated that core 1 also includes an input port, which is not illustrated. Output port 342 of core 1 is connected to input port 344 of core 2, which is in turn connected to input port 348 of core 3. Output port 350 of core 3 is connected to input port 348, and output port 346 of core 2 is connected to output port 350 of core 3.

The pins with which the ports are associated are illustrated as blocks 352, 354, 356, 358, and 360. Output port 342 is connected to pin 352, input port 344 is connected to pin 354, input port 348 is connected to pin 356, and output port 350 is connected to pin 358. Pins 352, 354, 356, and 358 are all sinks. Pin 360, which is a source, is connected to output port 342. Sink pin 352 is connected to source pin 360 by virtue of its association with output port 342 of core 1. Sink pin 354 is connected to source pin 360 by virtue of input port 344, which is associated with output port 342, which is associated with source pin 360. Sink pin 356 is connected to source pin 360 by virtue of association with input port 348, which is associated with input port 344. Similarly, sink pin 358 is connected to source pin 360 by virtue of association with output port 350, which is associated with input port 348.

In one embodiment, the present invention provides a programming interface for creating cores in which the connections between source and sink pins can be managed using the port abstraction. The various embodiments also support the generation of configuration bitstreams in which logic cores can be instantiated and connected using the ports associated with the cores.

The following sample program code illustrates constructing a core having ports. The code for constructing the core is followed by program code for implementing an adder and a multiplier core in a configuration bitstream using the respective ports of the cores for connections. The code is described with comments interspersed with the code and within the comment delimiters "/*" and "*/".

```
/* This core is identified as "ConstantMultiplier" and
performs the function of multiplying an input value by a
preprogrammed constant. */
public class ConstantMultiplier extends Core {
    private Port[ ] a; /* "a" is a group of input ports */
        /* A port is assigned to a group by virtue of the
        array of which it is a member. Thus, a[0], . . . a[n] are
        the member ports */
    private Port[ ] out; /* "out" is a group of output
                            ports */
    private int constant;
    private int size;
    /* This constructor constructs a constant multiplier
    with new ports */
    public ConstantMultiplier(int constant, int size) {
        this.constant = constant; /* save the constant */
        this.size = size;
        a = new Port[size]; /* instantiate port group a */
        for (int i=0;i<a.length;i++) {
            /* make group a input ports */
            a[i] = new Port(Wires.IN);
        }
        out = new Port[size];
        for (int i=0;i<out.length;i++) {
            /* make group out output ports */
            out = new Port(Wires.OUT);
        }
    }
    /* This alternative constructor constructs a constant
    multiplier with reused ports */
    public ConstantMultiplier(int constant, int size, Port[ ]
a, Port[ ] out) {
        this.constant = constant; /* save the constant */
        this.size = size;
        this.a = a;
        this.out = out;
    }
```

/* The set method of the ConstantMultiplier class defines and implements the functionality of the core. The set method is called by a program in order to implement the function of the ConstantMultiplier in the configuration bitstream. The details associated with implementing particular logic are beyond the scope of this invention and are not presented. The code below illustrates the programming interface for associating ports with pins. */

```
public void set(JBits jbits, int row, int col) {
    /* . . . define the internals of the core */
    /* which includes routing to the ports . . . */
    /* The following program interface call establishes
    the association between input port a[0] and a
    particular pin. In this example, input port a[0] is
    associated with the slice 0, F1 lookup table signal
    line of a Virtex CLB at the row and column specified
```

-continued

```
        by the parameters. The set method also generates
        bits for the configuration bitstream to connect the
        pin SOF1 to a source pin associated with port a, if
        such an association has been previously made. */
        jroute.route(a[0], new Pin(row, col, Wires.SOF1));
    }
            /* The following methods are included in the class
    ConstantMultiplier for use in obtaining port information
    for the core. Comparable methods are contemplated for
    other cores. */
        public Port[ ] getportA( ) {
            return a;
        }
        public Port[ ] getPortOut( ) {
            return out;
        }
            /* The unset method removes a logic core from a
            configuration bitstream along with connections to the
            core. */
        public void unset( ) {
            /* The unroute method is called for each port in a */
            /* The reverseUnroute is called for each output port */
            /* Remove routing internal to the core */
            /* Remove the programmed logic */
        }
}
```

The following sample program code illustrates usage of the constant multiplier core in combination with an adder core, the definition of which is not set forth herein.

```
    /* Instantiate the constant multiplier with constant value
        14 and size=8 bits. */
ConstantMultiplier multiplier=new ConstantMultiplier(14,
8);
    /* Instantiate an adder of size 8 bits (assuming a group of
        output ports called "Out" */
Adder adder=new Adder(8);
    /* Call the ConstantMultiplier set method to set bits in
        configuration bitstream for the logic core at row 12,
        column 22. */
multiplier.set(jbits, 12, 22);
    /* Call the adder set method to set bits in the configuration
        bitstream for the adder core at row 5, column 5. */
adder.set(jbits, 5, 5);
    /* Call the route method to set bits in the configuration
        bitstream for connecting the output of the adder to the
        input of the constant multiplier. */
jroute.route (adder.getPortOut( ), multiplier.getPortA( ) );
    /* In the embodiments described herein, the set methods
        do not need to be called before the calling of the route
        method. That is, the route method could be called first
        followed by calls to the set methods. The set method
        calls the route method to set bits in the configuration
        bitstream for configuration of the ports. */
/* Following the call to route the adder to the multiplier, a
program would presumably perform some additional
application-specific calculations. These calculations would
include configuring additional logic in the configuration
bitstream, downloading the configuration bitstream to the
PLD, monitoring application-specific operating
characteristics, and determining the need to change the
configuration in some respect. For example, it may be
desirable to change the constant used by the constant mul-
tiplier. The following code illustrates changing the constant
multiplier. Note that the user application maintains the
configuration bitstream with which the PLD is currently
programmed. */
    /* The following code sequence reconfigures the constant
        multiplier and reuses the current ports. The unset
        method of the ConstantMultiplier is called to remove
        the logic core from the configuration bitstream. */
multiplier.unset( );
    /* A new multiplier object is instantiated with the new
        constant value 27. The ports of the old multiplier are
        reused and associated with the new instance of the
        multiplier. */
multiplier=new ConstantMultiplier(27, 8,
multiplier.getPortA( ), multiplier.getPortOut( ) );
    /* In this example, the multiplier is set at the same row
        and column as the previous multiplier. It will be appre-
        ciated that the multiplier could be placed elsewhere. */
multiplier.set(jbits, 12, 22);
    /* As set forth above, the set method includes a call to the
        route method to configure connections for the ports.
        Since the ports are being reused, the configuration bits
        that are set for the ports will connect the adder to the
        multiplier. */
```

It will be appreciated that in other example applications, the constant multiplier need not be completely reconstructed. For example, if only the constant is to be changed for the constant multiplier, a method such as multiplier.changeConstant(newConstant) could be invoked to change the portion of the core that stores the constant. If little or no rerouting is required, this method may be appropriate. However, if a change requires significant routing, the process set forth above in the program code may be more suitable.

Figure 5:
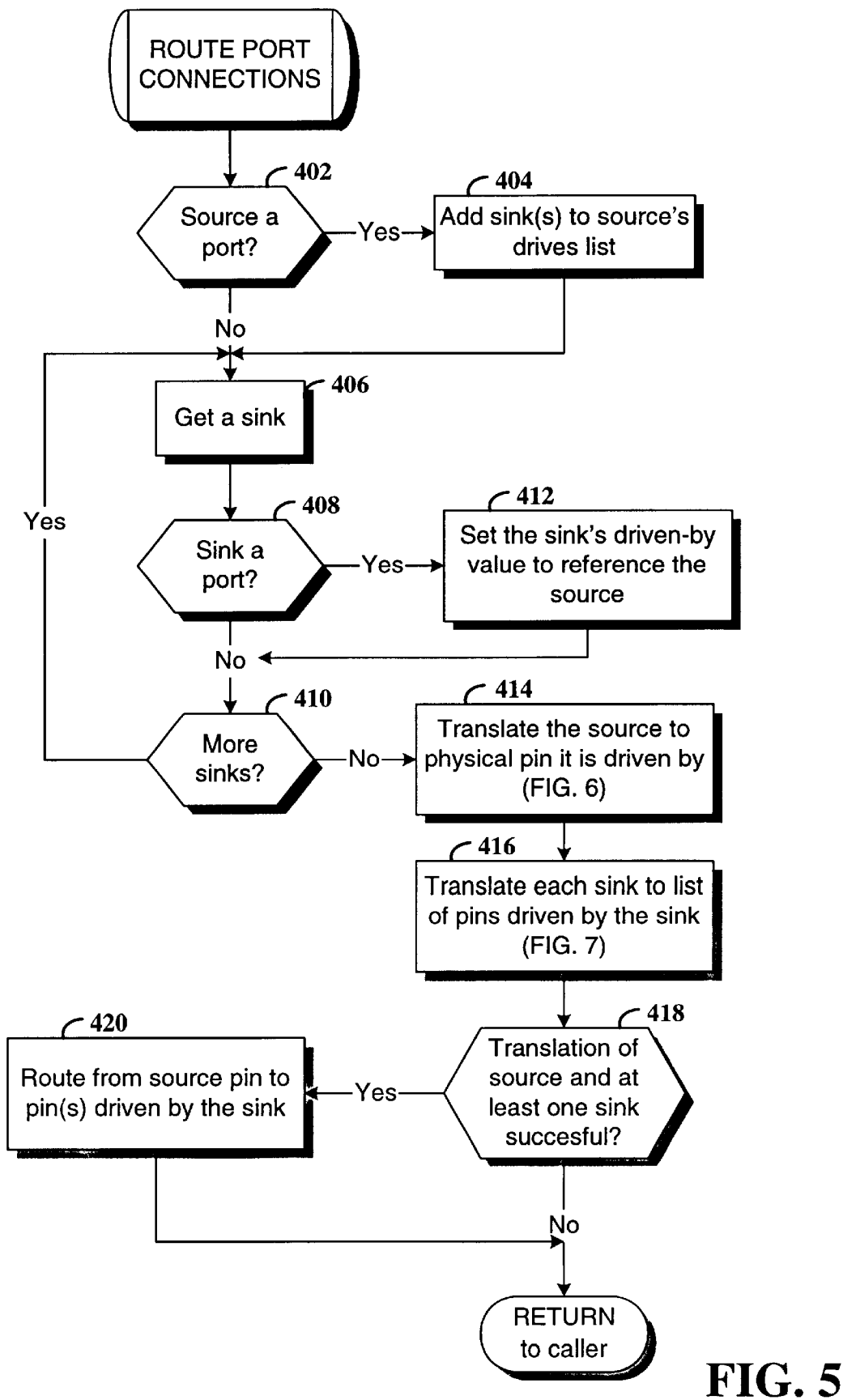
FIG. 5 is a flowchart of a process for routing port connections in accordance with one embodiment of the invention.

FIG. 5 is a flowchart of a process for routing port connections in accordance with one embodiment of the invention. The process of FIG. 5 implements a route method for use in writing program code to implement a logic core and in writing application program code that generates a configuration bitstream using the logic core. An example application program supports run-time reconfiguration of a PLD. The route process generally entails translating ports to the respective source and sink pins and routing the source pins to the sink pins. The process of FIG. 5 assumes that the input parameters reference routing a single source to one or more sinks. However, those skilled in the art will appreciate that the illustrated route process could be adapted to route multiple sources to multiple sinks, respectively.

The input parameters to the route process include a source and a sink, where the source and sink can be any combination of a port or a pin. Thus, the route process will route from port-to-port, port-to-pin, pin-to-port, and pin-to-pin. Decision step 402 tests whether the source parameter is a port. If the source is a port, step 404 adds the sink parameter to the drives list associated with the source. A drives list is maintained for each port and includes the ports and pins that are driven by the port. Referring to FIG. 4, for example, the drives list of port 344 includes port 348 and pin 354.

At step 406, an input sink parameter is obtained. If the sink is a port (decision step 408), the sink's driven-by value is set to reference the source (step 412). A driven-by value is maintained for each sink to reference the source that drives the sink. For example, port 346 of FIG. 4 is driven by port 350, and port 346 has a driven-by value that references port 350. Decision step 410 tests whether there are more sinks to process. If so, processing returns to step 406 to get the next sink to process. Otherwise, processing continues at step 414.

At step 414, the source is translated to the pin that drives the source. For example, if source port 344 is being routed to port 348, the translation of source 344 is pin 360 within core 1. At step 416, each of the sinks is translated to a list of pins driven by the sink. For example, if a route call has port 342 as the source parameter and port 344 as the sink parameter, port 344 is translated to the list of pins 354, 356, and 358.

Decision step 418 tests whether the translations of the source and at least one sink were successful. That is, the process tests whether the source was translated to a pin and at least one of the sinks was translated to a pin. If not, control is returned to the calling program. Otherwise, processing continues at step 420.

The source pin is-routed to the sink pin(s) at step 420. The routing methods described in U.S. Pat. No. 6,487,709, referenced above, are suitable for generating bits in the configuration bitstream to connect the source and sink pins. When the routing is complete, control is returned to the calling program.

Figure 6:
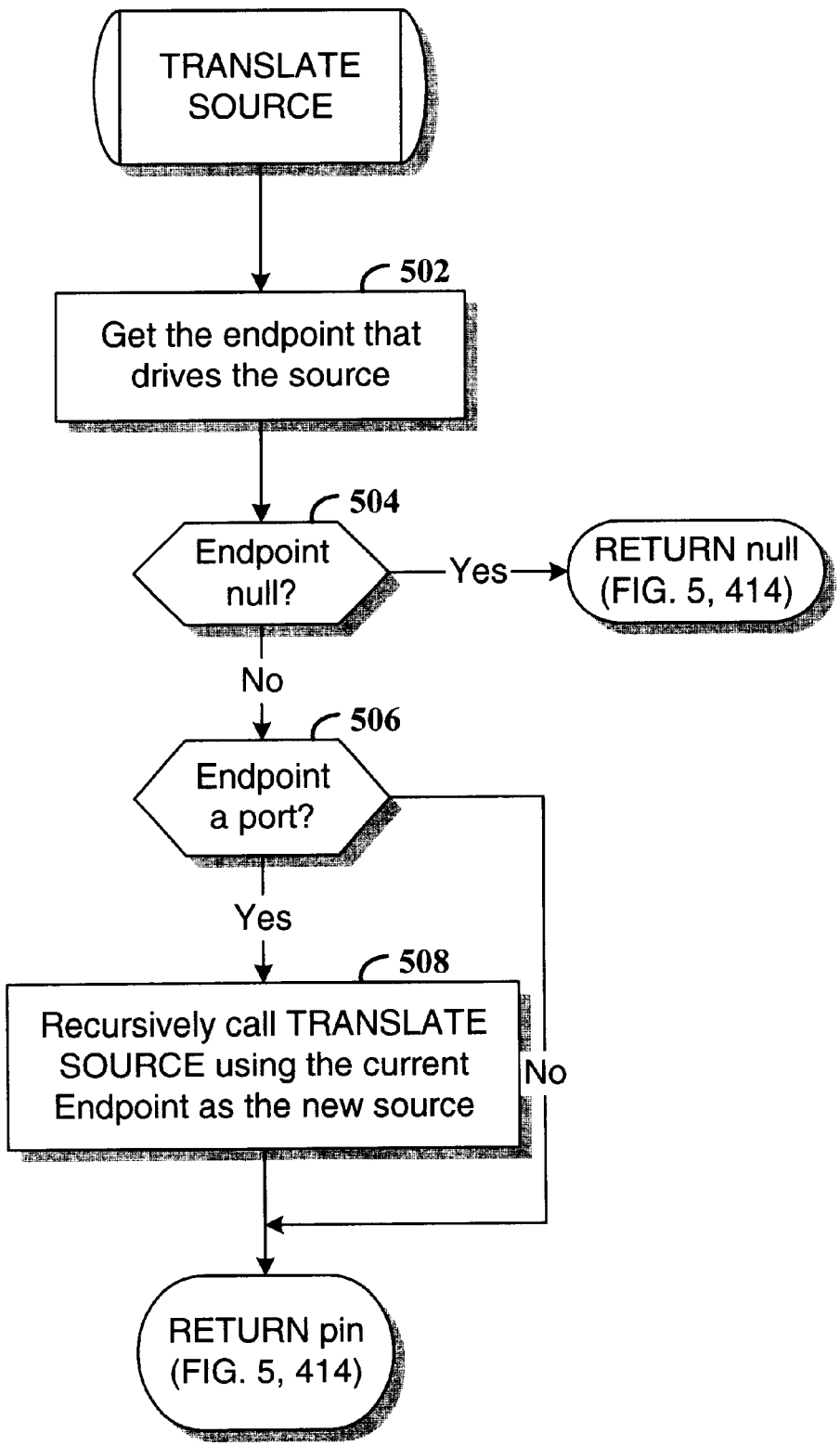
FIG. 6 is a flowchart of a process for translating a source to the pin that drives the source in accordance with one embodiment of the invention.

FIG. 6 is a flowchart of a process for translating a source to the pin that drives the source in accordance with one embodiment of the invention. The process generally entails tracing the end points that drive the source back to a pin. When a pin is found, the pin is returned as the pin that drives the source.

At step 502, the endpoint that drives the input source parameter is obtained from the driven-by value of the source. An endpoint is a class of object that can be either a pin or a port. If the endpoint is null, that is, if no value has yet been assigned to the driven-by value of the source, then a null value is returned to the calling program. Otherwise, processing continues at step 506.

Decision step 506 tests whether the endpoint is a port. If so, the translate source process is called recursively (step 508), using the new endpoint as the input source parameter. Eventually, the translate source process encounters either a null endpoint (i.e., decision step 504 results in a "yes") or an endpoint that is a pin rather than a port (i.e., decision step 506 results in a "no"). When a pin is encountered, the pin is returned from the process.

Figure 7:
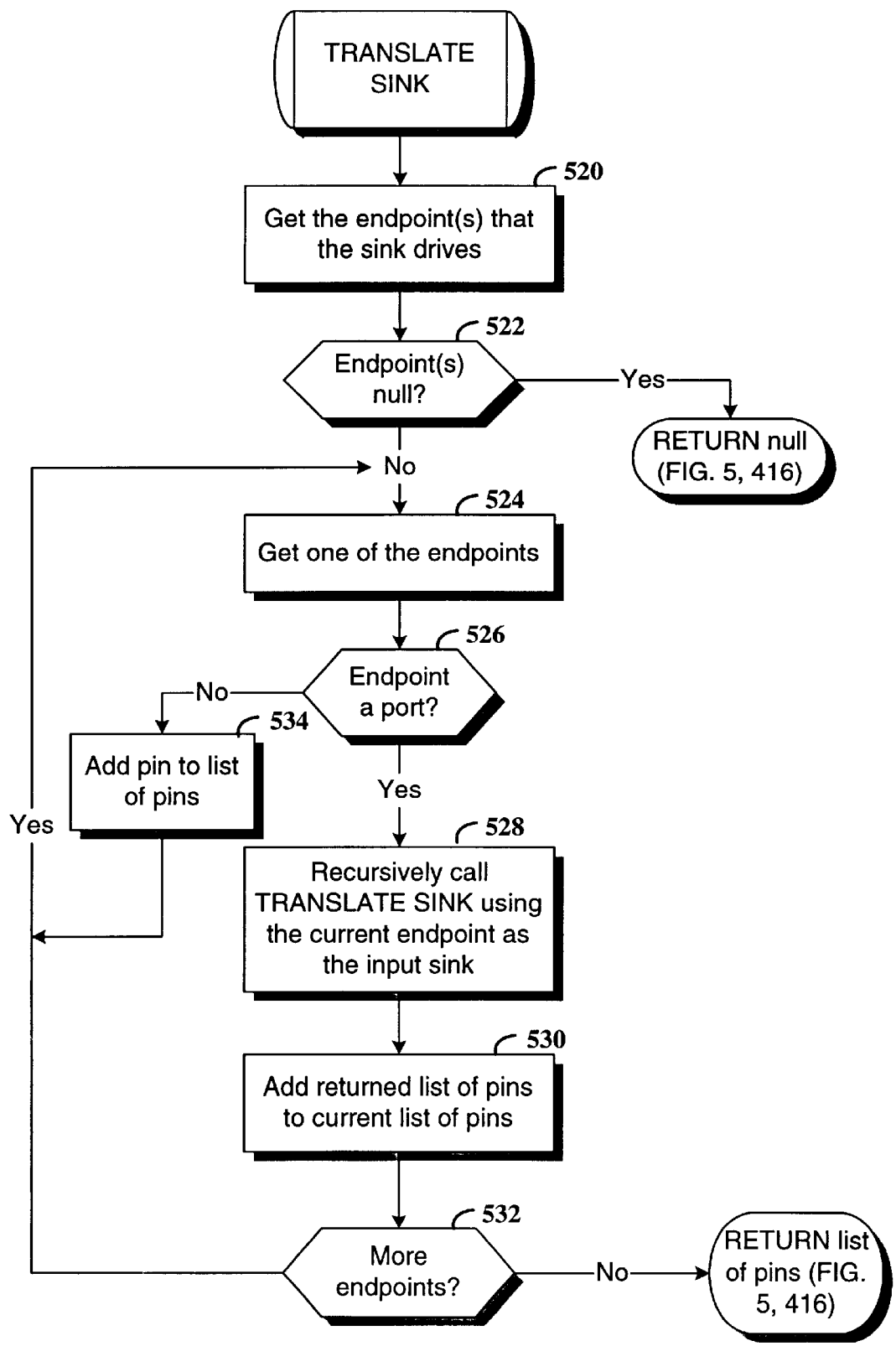
FIG. 7 is a flowchart of a process for translating a sink to a list of pins driven by the sink.

FIG. 7 is a flowchart of a process for translating a sink to a list of pins driven by the sink. The process generally entails tracing the sink to the pins driven by the sink and returning the list of pins. Recall that a drives list is maintained for each sink. At step 520, the endpoints that the sink drives are obtained from the drives list.

If the list of endpoints is null, the null list is returned to the calling program. Otherwise, decision step 522 directs processing to step 524, where one of the endpoints is obtained from the list. Decision step 526 tests whether the endpoint is a port. If the endpoint is a port, the translate sink process is called recursively at step 528 using the port as the input sink parameter. At step 530, the list of pins returned from the recursive call of step 528 is added to the current list of pins.

Decision step 532 tests whether there are additional endpoints to process. If so, the process returns to step 524. Otherwise, the current list of pins is returned to the calling program. When decision step 526 finds that the endpoint is a pin (i.e., is not a port), the process is directed to step 534. At step 534, when an endpoint that is a pin is encountered, the process adds the pin to the list of pins to be returned to the calling program, and the process flow returns to step 524.

The processes for unrouting and reverse unrouting input and output ports differ slightly from the processes for unrouting and reverse unrouting source and sink pins as described in U.S. Pat. No. 6,487,709, referenced above. The processes are described below. The unroute process turns off connections and releases the resources of a circuit beginning at the endpoint input parameter. All connections of paths to all sinks are removed by clearing the appropriate bits in the configuration bitstream. The reverse unroute process turns off connections and releases the resources of a circuit starting from the input endpoint parameter and working backwards. All connections are removed up to the point where a wire is one of several wires being driven.

The process for unrouting an input or output port entails translating the port to each sink pin driven by the port, performing a reverse unroute from the identified sink pins, and removing all endpoints from the drives list of the port. If, for example, an unroute of input port 344 (FIG. 4) is desired, port 344 is translated to the list of sink pins 354, 356, and 358. The reverse unroute process begins at a sink pin and unroutes from the sink pin back in the path to where another sink pin is routed. For example, in reverse unrouting sink 358, connections are removed back in the path to point 362 where the path splits to sink 356. Sink 356 is reverse unrouted back in the path to point 364 where the path splits to sink 354. Sink 354 is reverse unrouted back to point 366. Port 348 and pin 354 are removed from the drives list of input port 344.

The process for reverse unrouting an input or output port entails translating the port to each sink pin driven by the port, reverse unrouting the identified sink pins, and removing the driven-by value associated with the port. For example, to reverse unroute input port 344 (FIG. 4), the input port is translated to sink pins 354, 356, and 358. From sink pins 354, 356, and 358, a reverse unroute is performed back to point 366. The driven-by value, which is associated with port 344 and identifies source pin 360, is removed.

The present invention is believed to be applicable to a variety of processes for implementing circuit designs and has been found to be particularly applicable and beneficial in PLDs. While the present invention is not so limited, an appreciation of the present invention has been provided by way of specific examples involving PLDs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for generating a configuration bitstream for a programmable logic device, comprising:

associating logic ports with respective ones of a plurality of logic cores;

establishing logical connections between selected ones of the ports;

associating source pins with selected ones of the ports, wherein a pin represents an output resource of a configurable element of the programmable logic device;

associating sink pins with selected ones of the ports, wherein a sink pin represents an input resource of a configurable element of the programmable logic device; and generating bits in the configuration bitstream for configuration of routing resources to connect selected ones of the source pins to selected ones of the sink pins responsive to programming interface calls calling for connection of referenced ports.

2. The method of claim 1, wherein the ports are of types input and output, and at least one of the logical connections between selected ones of the ports is from a first input port to a second input port.

3. The method of claim 1, wherein the ports are of types input and output, and at least one of the logical connections between selected ones of the ports is from an input port to an output port.

4. The method of claim 1, wherein the ports are of types input and output, and at least one of the logical connections between selected ones of the ports is from an output port to an input port.

5. The method of claim 1, wherein the ports are of types input and output, and at least one of the logical connections between selected ones of the ports is from a first output port to a second output port.

6. The method of claim 1, wherein the ports are of types input and output, at least one of the logical connections between selected ones of the ports is from a first input port to a second input port, at least one of the logical connections is from an input port to an output port, at least one of the logical connections is from an output port to an input port, and at least one of the logical connections is from a first output port to a second output port.

7. The method of claim 1, further comprising in response to a programming interface call calling for connection of referenced source and sink ports:

identifying a pin that drives the source port;

identifying one or more pins driven by the sink port; and generating bits for the configuration bitstream to connect the pin that drives the source port to the one or more pins driven by the sink port.

8. The method of claim 7, further comprising generating bits in the configuration bitstream for configuration of routing resources to disconnect one of the source pins from one or more sink pins responsive to an unroute programming interface call that references a port.

9. The method of claim 8, further comprising:

saving data indicating which pins drive which ports;

saving data indicating which sets of one or more pins are driven by which ports, respectively; and deleting data indicating a set of one or more pins that are driven by the port referenced in the unroute programming interface call.

10. The method of claim 1, further comprising defining the logic cores and ports with object-oriented classes.

11. The method of claim 10, wherein the object-oriented classes are Java classes.

12. A computer-implemented method for generating a configuration bitstream for a programmable logic device, comprising:

associating a logical output port with a first logic core;

associating a logical input port with a second logic core;

responsive to a first programming interface call, instantiating the first logic core in the configuration bitstream and associating the logical output port with a pin within the first logic core;

responsive to a second programming interface call, instantiating the second logic core in the configuration bitstream and associating the logical input port with one or more pins within the second logic core; and generating bits in the configuration bitstream for configuration of routing resources to connect the pin within the first logic core to the one or more pins within the second logic core responsive to a third programming interface call calling for routing and referencing the input and output ports.

13. The method of claim 12, wherein the third programming interface call has as input parameters a source and a sink, the source having as possible types an output port and a pin, and the sink having as possible types an input port and a pin.

14. The method of claim 13, further comprising in response to the third programming interface call:

if the source is a port, saving data indicating that the source drives the sink;

if the sink is a port, saving data indicating that the sink is driven by the source.

15. The method of claim 14, further comprising in response to an unroute programming interface call having as an input parameter a port, clearing selected bits in the configuration bitstream to disconnect pins associated with the port.

16. The method of claim 15, further comprising in response to the unroute programming interface call:

identifying one or more pins driven by the port;

identifying a pin that drives the port;

generating bits in the configuration bitstream to disconnect the one or more pins driven by the port from the pin that drives the port; and deleting data indicating pins and ports driven by the port.

17. The method of claim 15, further comprising in response to a reverse-unroute programming interface call having as an input parameter a port:

identifying one or more pins driven by the port;

identifying a pin that drives the port;

generating bits in the configuration bitstream to disconnect the one or more pins driven by the port from the pin that drives the port; and deleting data indicating the pin that drives the port.

18. A computer-implemented method for generating a configuration bitstream for a programmable logic device, comprising:

associating a logical output port with a first logic core;

associating a:logical input port with a second logic core;

associating the logical output port of the first logic core with the logical input port of the second logic core;

responsive to a first programming interface call, instantiating the first logic core in a configuration bitstream and associating the logical output port with a pin within the first logic core; and responsive to a second programming interface call, instantiating the second logic core in the configuration bitstream, associating the logical input port with the one or more pins within the second logic core, and generating configuration bits for configuration of routing resources to connect the pin within the first logic core to the one or more pins within the second logic core.

19. A computer-implemented method for generating a configuration bitstream for a programmable logic device, comprising:

associating a plurality of logical output ports with a first logic core;

associating a plurality of logical input ports with a second logic core;

responsive to a first programming interface call, instantiating the first logic core in the configuration bitstream and associating the logical output ports with pins within the first logic core;

responsive to a second programming interface call, instantiating the second logic core in the configuration bitstream and associating the logical input ports with pins within the second logic core; and generating bits in the configuration bitstream for configuration of routing resources to connect the pins within the first logic core to pins within the second logic core responsive to a third programming interface call referencing the first and second pluralities of input and output ports.

20. An apparatus for generating a configuration bitstream for a programmable logic device, comprising:

means for associating logic ports with respective ones of a plurality of logic cores;

means for establishing logical connections between selected ones of the ports;

means for associating source pins with selected ones of the ports, wherein a pin represents an output resource of a configurable element of the programmable logic device;

means for associating sink pins with selected ones of the ports, wherein a sink pin represents an input resource of a configurable element of the programmable logic device; and means for generating bits in the configuration bitstream for configuration of routing resources to connect selected ones of the source pins to selected ones of the sink pins responsive to programming interface calls calling for connection of referenced ports.

* * * * *